US012801509B2

(12) United States Patent
Mukherjee et al.

(10) Patent No.: US 12,801,509 B2
(45) Date of Patent: Nov. 17, 2026

(54) LOGGING AND VISUALIZING EXECUTION FLOW IN A LARGE LANGUAGE MODEL (LLM) ENABLED USER QUERY APPLICATION

(71) Applicant: INTUIT INC., Mountain View, CA (US)

(72) Inventors: Manas Kumar Mukherjee, Mountain View, CA (US); Naga Venkata Vijay Sai Jujjuri, Bangalore (IN); Catherine Kung, Mountain View, CA (US); Sumanth Venkatasubbaiah, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 301 days.

(21) Appl. No.: 18/614,582

(22) Filed: Mar. 22, 2024

(65) Prior Publication Data

US 2025/0298591 A1 Sep. 25, 2025

(51) Int. Cl.

*G06F 11/3604* (2025.01)
*G06F 8/34* (2018.01)
*G06F 8/36* (2018.01)
*G06F 8/41* (2018.01)

(52) U.S. Cl.

CPC ............ *G06F 11/3612* (2013.01); *G06F 8/34* (2013.01); *G06F 8/36* (2013.01); *G06F 8/433* (2013.01)

(58) Field of Classification Search

None

See application file for complete search history.

(56) References Cited

U.S. PATENT DOCUMENTS

| | | | | |
|---|---|---|---|---|
| 2005/0097110 | A1* | 5/2005 | Nishanov | G06F 16/258 |
| 2013/0204619 | A1* | 8/2013 | Berman | G06F 3/167 704/235 |
| 2015/0347243 | A1* | 12/2015 | Guerin | G06F 15/17331 709/212 |
| 2016/0098342 | A1* | 4/2016 | Faizanullah | G06F 11/3447 717/131 |
| 2017/0076012 | A1* | 3/2017 | Sreenivasa | G06F 16/907 |
| 2018/0113783 | A1* | 4/2018 | Luo | G06F 11/3636 |
| 2019/0012254 | A1* | 1/2019 | Gupta | G06F 11/3476 |
| 2020/0026787 | A1* | 1/2020 | Alam | G16Y 20/00 |
| 2020/0110654 | A1* | 4/2020 | Oleszkiewicz | G06F 11/0781 |
| 2021/0392202 | A1* | 12/2021 | Henning | H04L 67/63 |
| 2024/0411824 | A1* | 12/2024 | Sahu | G06F 3/04895 |
| 2025/0086439 | A1* | 3/2025 | Paul | G06N 3/0475 |

* cited by examiner

*Primary Examiner* — Qing Chen

(74) *Attorney, Agent, or Firm* — DLA PIPER LLP US

(57) ABSTRACT

Methods and systems for logging and visualizing execution flow for LLM enabled applications. The methods and systems capture structured log data from a plurality of software stacks in between a user application and a large language model when processing a user query, each of the plurality of software stacks following a predefined format to generate the structured log data. The methods and systems also generate an execution graph as an ordered script from the captured structured log data. The methods and systems further render a hierarchical view of the generated execution graph in a graphical user interface.

16 Claims, 7 Drawing Sheets

500

300

400a

400b

500

LOGGING AND VISUALIZING EXECUTION FLOW IN A LARGE LANGUAGE MODEL (LLM) ENABLED USER QUERY APPLICATION

BACKGROUND

The advent of large language models (LLMs) has enabled many and varied user facing applications. LLM enabled chatbots, answering services, and search engines are being developed rapidly. Incorporating LLMs into user facing services requires integrating with the LLMs different types of software stacks such as user interface applications, orchestration services, conversation services, and the like. Such integration, necessary to bring forth the power of the LLMs, creates a significant technical complexity in all phases of LLM-enabled user applications.

An example of the technical complexity occurs during debugging. During development of the user facing applications, developers use sample prompts (or queries) that mimic end-user interactions. During production, developers may need to use historical interactions to assess how the software stacks handled previous queries. Current technology does not provide tools to easily log, visualize, and understand how the sample queries are processed in a bidirectional flow: from the applications through the software stacks to the LLMs and back from the LLMs through the software stacks to the applications.

This lack of logging and visualization tools creates a three-fold technical challenge. First, the integrated software stacks are diverse and developers specializing in one software stack generally have a limited knowledge of other software stacks. That is, a developer will understand the workflow and error messages for the software stack he/she is knowledgeable about, but will not understand the same for other software stacks. Second, the diverse software stacks have their own logging patterns, making it cumbersome to trace log statements through non-uniform logging patterns. Third, many operations occur in parallel or asynchronously through the diverse software stacks, thereby making it extremely difficult to visualize and trace the execution flow. This situation is clearly undesirable.

Therefore, a significant technical improvement in logging and visualizing execution flow in the software stacks integrated with LLMs is desired.

SUMMARY

Embodiments disclosed herein solve the aforementioned technical problems and may provide other solutions as well. In one or more embodiments, a uniform logging format is enforced for developers to write log statements in the same format across different software stacks. At runtime, structured log data generated by the execution of the uniform log statements is captured. The structured log data generally includes an identification for the stage of processing a user query, an input to the stage, an output from the stage, a description of the stage, metadata associated with the stage, and/or other parameters. Using the structured log data, an execution graph is generated. The execution graph facilitates a visualization of the execution flow during the processing of the user query. A developer can use the execution graph—e.g., rendered in a graphical user interface—to trace the flow and hierarchically move between stages and substages. Additionally, the structured log data is grouped by transaction identification and saved in a long term storage future access and analysis.

In one or more embodiments, a method is provided. The method may comprise capturing structured log data from a plurality of software stacks in between a user application and a large language model when processing a user query, each of the plurality of software stacks following a predefined format to generate the structured log data. The method may also comprise generating an execution graph as an ordered script from the captured structured log data. The method may further comprise rendering a hierarchical view of the generated execution graph in a graphical user interface.

In one or more embodiments, a system is provided. The system may comprise a non-transitory storage medium storing computer program instructions. The system may also comprise a processor configured to execute the computer program instructions to cause operations. The operations may comprise capturing structured log data from a plurality of software stacks in between a user application and a large language model when processing a user query, each of the plurality of software stacks following a predefined format to generate the structured log data. The operations may also comprise generating an execution graph as an ordered script from the captured structured log data. The operations may further comprise rendering a hierarchical view of the generated execution graph in a graphical user interface.

DETAILED DESCRIPTION OF SEVERAL EMBODIMENTS

Embodiments disclosed herein provide a significant improvement over conventional LLM enabled user query processing systems. Particularly, a uniform logging format is enforced across diverse software stacks. Structured log data is captured using the uniform logging format and an execution graph is generated based on the structured log data. The structured log data is used to render a hierarchical view of the generated execution graph.

Figure 1:
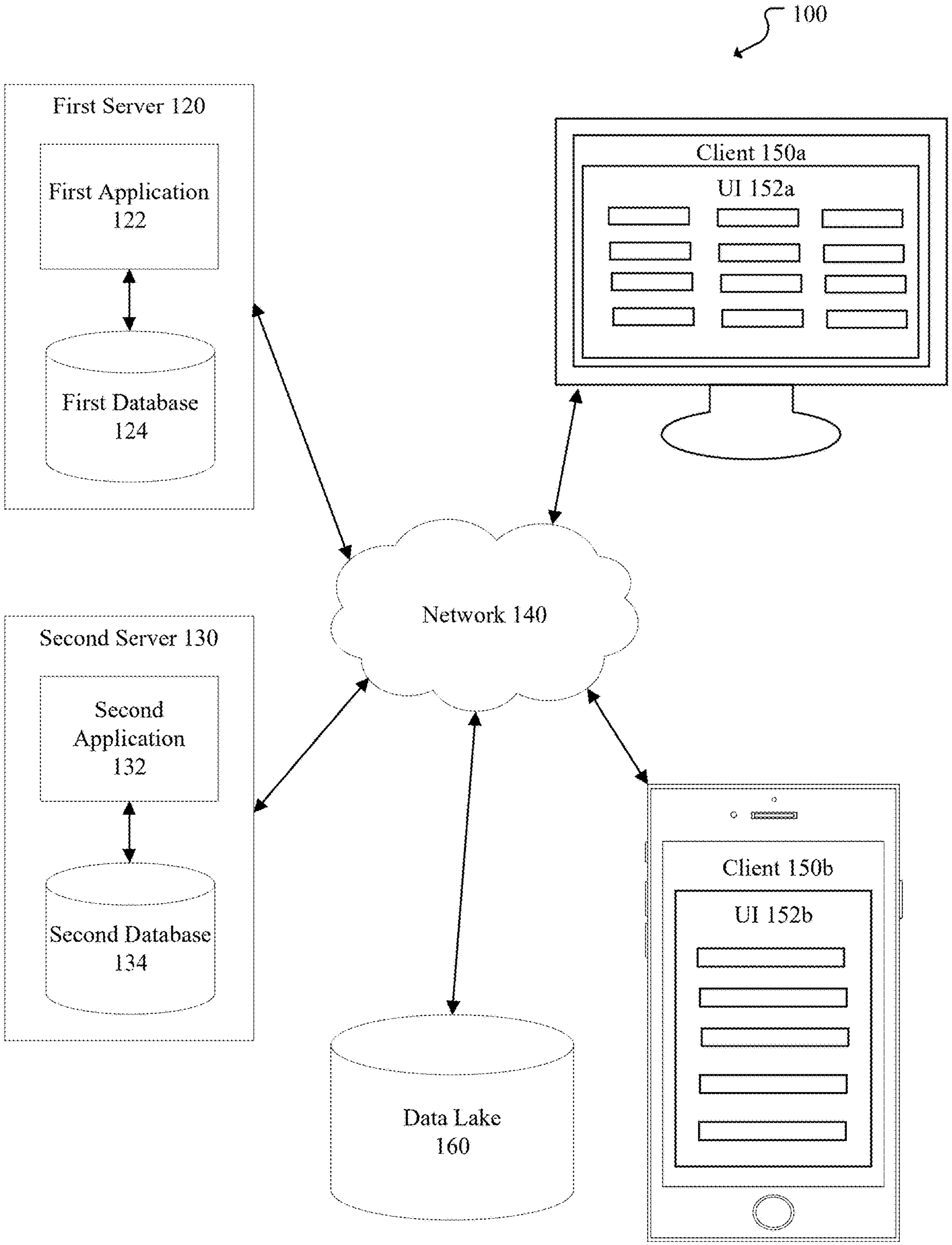
FIG. 1 shows an example system configured for logging and visualizing execution flow in LLM enabled systems, based on the principles disclosed herein.

FIG. 1 shows an example system 100 configured for logging and visualizing execution flow in LLM enabled systems, based on the principles disclosed herein. It should be understood that the components of the system 100 shown in FIG. 1 and described herein are merely examples and systems with additional, alternative, or fewer number of components should be considered within the scope of this disclosure.

As shown, the system 100 comprises client devices 150*a*, 150*b* (collectively referred to herein as "client devices 150"), servers 120, 130, and a data lake 160 interconnected by a network 140. The first server 120 hosts a first server application 122 and a first database 124 and the second server 130 hosts a second server application 132 and a second database 134. The client devices 150*a*, 150*b* have user interfaces 152*a*,152*b*, respectively (collectively referred to herein as "user interfaces (UIs) 152"), which may be used to communicate with the server applications 122, 132 and the data lake 160 using the network 140. The data lake 160 includes a database maintained by a cloud service provider. For example, the data lake 160 includes AWS S3 storage storing a plurality of data tables as hive tables in a plurality of buckets.

The server applications 122, 132 perform various operations described throughout this disclosure. For example, the server applications capture structured log data during the processing of a user request, generate an execution graph as an ordered script (e.g., in JSON format) from the captured structured log data, and render a hierarchical view of the generated execution graphical in the UIs 152. The server applications 122, 132 use corresponding databases 124, 134 to store data such as the captured log data and the execution graph. The server applications 122, 132 use the data lake 160 for long term storage of the captured log data. In one or more embodiments, the long term storage in the data lake 160 is grouped by transaction identification numbers.

Communication between the different components of the system 100 is facilitated by one or more application programming interfaces (APIs). APIs of system 100 may be proprietary and or may include such APIs as AWS APIs or the like. The network 140 may be the Internet and or other public or private networks or combinations thereof. The network 140 therefore should be understood to include any type of circuit switching network, packet switching network, or a combination thereof. Non-limiting examples of the network 140 may include a local area network (LAN), metropolitan area network (MAN), wide area network (WAN), and the like.

Client devices 150 may include any device configured to present user interfaces (UIs) 152 and receive user inputs, e.g., developer user inputs. The UIs 152 are generally graphical user interfaces (GUIs). For example, a developer user may use the UIs to provide configuration parameters, provide commands to implement the embodiments disclosed herein. Additionally, the UIs 152 can the visual rendering of the execution graph and allow the developer user to switch between different levels of hierarchy.

First server 120, second server 130, first database 124, second database 134, and client devices 150 are each depicted as single devices for ease of illustration, but those of ordinary skill in the art will appreciate that first server 120, second server 130, first database 124, second database 134, and or client devices 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one or two) servers. In another example, a plurality of client devices 150 may communicate with first server 120 and or second server 130. A single user may have multiple client devices 150, and or there may be multiple users each having their own client devices 150.

Furthermore, it should be understood that the server applications 122, 132 running on the servers 120, 130, and the databases 124, 134 being hosted by the servers 120, 130 is just an example, and should not be considered limiting. Different portions of the server applications 122, 132 and, in one or more embodiments, the entirety of the server applications 122, 132 can be stored in the client devices 150. Similarly, different portions or even the entirety of the databases 124, 134 can be stored in the client devices 150. Therefore, the functionality described throughout this disclosure can be implemented at any portion of the system 100.

Figure 2:
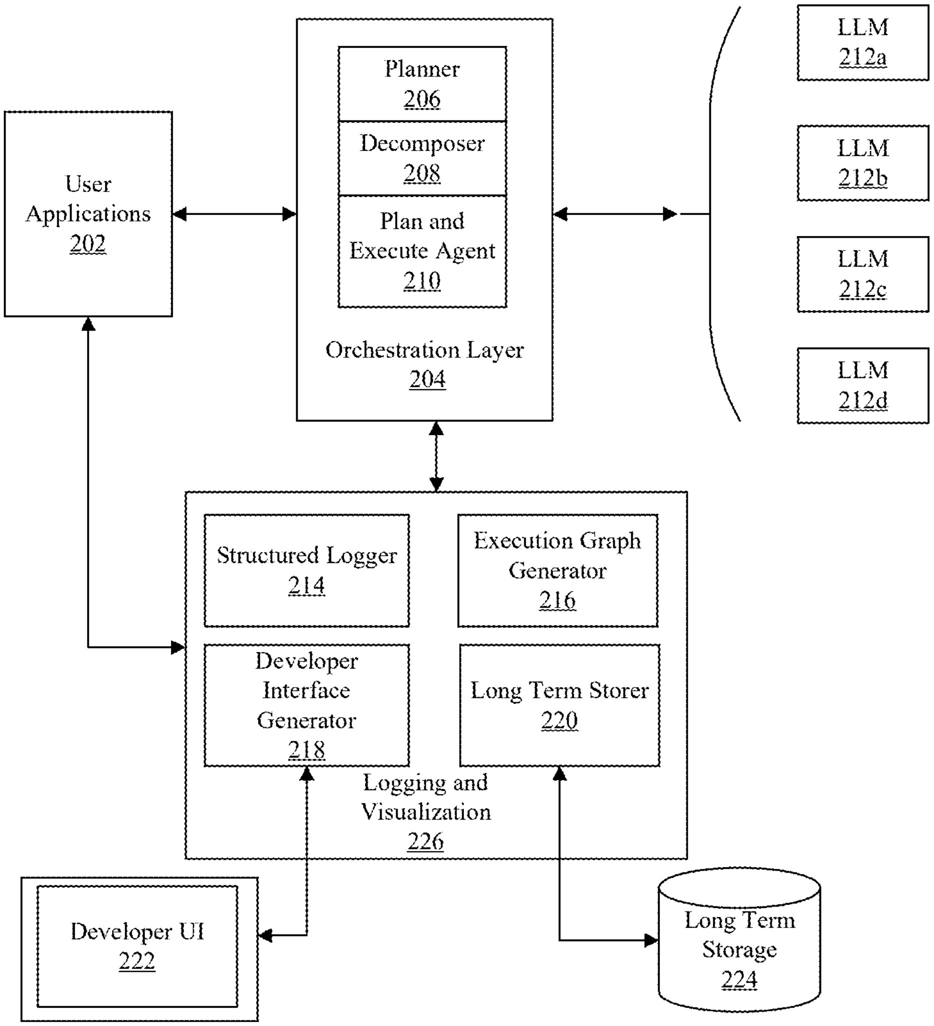
FIG. 2 shows an example architecture for logging and visualizing execution flows in LLM enabled systems, based on the principles disclosed herein.

FIG. 2 shows an example architecture 200 for logging and visualizing execution flows in LLM enabled systems, based on the principles disclosed herein. It should be understood that the components of the architecture 200 are merely intended as examples and should not be considered limiting. That is architectures with additional, alternative, or fewer number of components should be considered within the scope of this disclosure. The architecture 200 can be implemented by portion of the system 100 shown in FIG. 1.

The embodiments are described using Intuit®'s GenOS®, which is just an example. Additionally, the example scripts are shown in Python® and its related native logging format, which too is an example. The embodiments therefore apply to any kind of platform similar to GenOS® and/or can use any kind of programming language such as Java®, Julia®, etc. Additionally, details about known components are omitted for the sake of brevity and to focus on the novel principles disclosed herein.

User applications 202 include any type of LLM enabled user facing applications and interfaces. For example, the user applications 202 may include chatbots, query interfaces, search engines, and/or any type of application or interface that facilitates the user's queries to be handled by LLMs 212*a*-212*d* (commonly referred to as LLM 212 and collectively referred to as LLMs 212). An orchestration layer 204 functions as an intermediary between the user applications 202 and the LLMs 212. For instance, the orchestration layer 204 may include a planner 206 that plans for the steps to be taken by the architecture 200 to handle user queries at the user applications 202. A decomposer 208 divides a compound query into multiple simpler queries. A plan and execute agent 210 executes multiple subtasks to services the query. Each component in the orchestration layer 204 may be different types of software stacks provided by different vendors and having their own original logging formats. Embodiments disclosed herein facilitate a standard logging through all the software stacks such that execution flows through the architecture may be uniformly logged and visualized. Furthermore, there may be several other software stacks within the orchestration layer 204 and there may be additional layers between the orchestration layer 204 and the LLMs 212. These layers are known in the art, and will not be described in detail.

The LLMs 212 are configured to service the queries received from the user applications 202. Non-limiting examples of the LLMs 212 include GPT-3.5 (OpenAI®), GPT-4 (OpenAI®), ChatGPT (OpenAI®), PaLM (Google®), LLaMa (Meta®), BLOOM, Ernie 3.0 Titan, and/or Claude, to name a few. When the LLMs 212 answer the user queries, the answers are sent back to the user applications 202 through the orchestration layer 204.

The architecture 200 also includes a logging and visualization module 226. As shown, the logging and visualization module 226 includes a structured logger 214, an execution graph generator 216, a developer interface generator 218, and long term storer 220. The developer interface generator 218 interfaces with developer user interface 222 and the long term storer 220 interfaces with long term storage 224.

The structured logger 214 captures structured log data across the software stacks (e.g., the software stacks shown in the architecture 200). Embodiments disclosed herein define a format of the structured log data so that developers can write the structured log data in the uniform format across software stacks. For example, the architecture 200 may receive a predefined format and enforce the predefined format uniformly across different software stacks. The structured logger 214 therefore captures structured log data in the uniform format, regardless of where the log data originated in the software stack. For example, at the end of each major stage (e.g., network call or time consuming heavy processing), a developer writes structured log data to be captured by the structured logger 214. The captured structured log data is in the form of a structured object comprising a name of a stage, an input to the stage, output from the stage, a description of the stage (e.g., planning stage at the planner 206, execution stage at the plan and execute agent 210), and stage metadata. For example, a library usage can be written as

```
_GENLOG.debug(f"Successfully executed the plugin={name_for_model} from {plugin_tool_def.url}", extra=log_metadata)
```

In the above example, log_metadata is a typed object defined using the library Pydantic® (not a limiting example, but just a use case for illustration purposes) and the structure of the corresponding typed class can be defined as follows:

```
class GenosLogExtra(BaseModel):
    input: Optional[GenosLogInput]=None
    output: Optional[GenosLogOutput]=None
    log_level: Optional[str]=Field(default="LOGLEVEL_PLACEHOLDER")
    intuit_tid: str
    module_name: Optional[str] Field(default=" MODULE_PLACEHOLDER")
    function_name: Optional[str]=Field (default="FUNCTION_PLACEHOLDER")
    genos_flow_info: FlowInfo
    account_id: Optional[str]=Field (default="ACCOUNT_ID_PLACEHOLDER")
    user_id: Optional[str]=Field (default="USER_ID_PLACEHOLDER")
    error_details: Optional[ErrorDetails]=None
    log_message: Optional[str]=Field (default="LOG_MESSAGE")
    should_log_to_splunk: bool #will log to splunk in case flag is set to true
    should_persist_to_debug_manager: bool #will be pushed to store data in debug manager
    should_persist_to_eventbus: bool #will be pushed to store data in eventbus topic
  event_timestamp: Optional[int]=Field(default=0)
  experience_id: Optional[str]=Field (default="EXPERIENCE_ID_PLACEHOLDER")
    scope_id: Optional[str]=Field (default="SCOPE_ID_PLACEHOLDER")
    plugin_name: Optional[str]=None
```

The execution graph generator 216 generates an execution graph based on the log data captured by the structured logger 214. In one or more embodiments, a developer can indicate whether log data should be shown in the execution graph. For example, the developer can set the flag "should_persist_to_debug_manager" (an example of a persistency flag) as "True." The execution graph generator 216 uses this flag to generate the execution graph based on the log data and returns the execution graph as a JSON object. Therefore when,

```
log_metadata=GenosLogExtra( . . . , should_persist_to_debug_manager=True)
```

and the execution graph generating module 204 is invoked by the script

```
_GENLOG.debug(f"Successfully executed the plugin={name_for_model} from {plugin_tool_def.url}", extra=log_metadata),
```

the execution graph generating module 204 returns the JSON object (just as an example, any other ordered structure may be used) as follows:

```
{
  "intuit_tid": 123,
  "timestamp": 53543533533,
  "debug_data": [
    {
      "stage_id": 1,
      "input": "Input to the process",
      "output": "Output to the process",
      "metadata": {all context specific metadata as key-value pairs}
      "Stage_description": " . . . description . . . ",
      "log_message": "free form log data passed by the service developer"
    },
    {
      "stage_id": 2
      "input": "Input to the process",
      "output": "Output to the process",
      "metadata": {all context specific metadata as key-value pairs}
      "Stage_description": " . . . description . . . ",
      "log_message": "free form log data passed by the service developer"
    }
    . . . .
  }
  ]
}
```

The JSON object shows various stages ("stage_id"), the input to the stages ("input"), output from the stages ("output"), metadata of the corresponding stage ("metadata"), description of the corresponding stage ("Stage_description"), other messages written by the developer ("log message"), and/or the like. Using such JSON object (or any other type of structured data) generated by the execution graph generator 216, any type of data visualization tool can generate a customized rendering. For example, the developer interface generator 218 may generate a customized rendering to be shown in the developer user interface 222.

Figure 3:
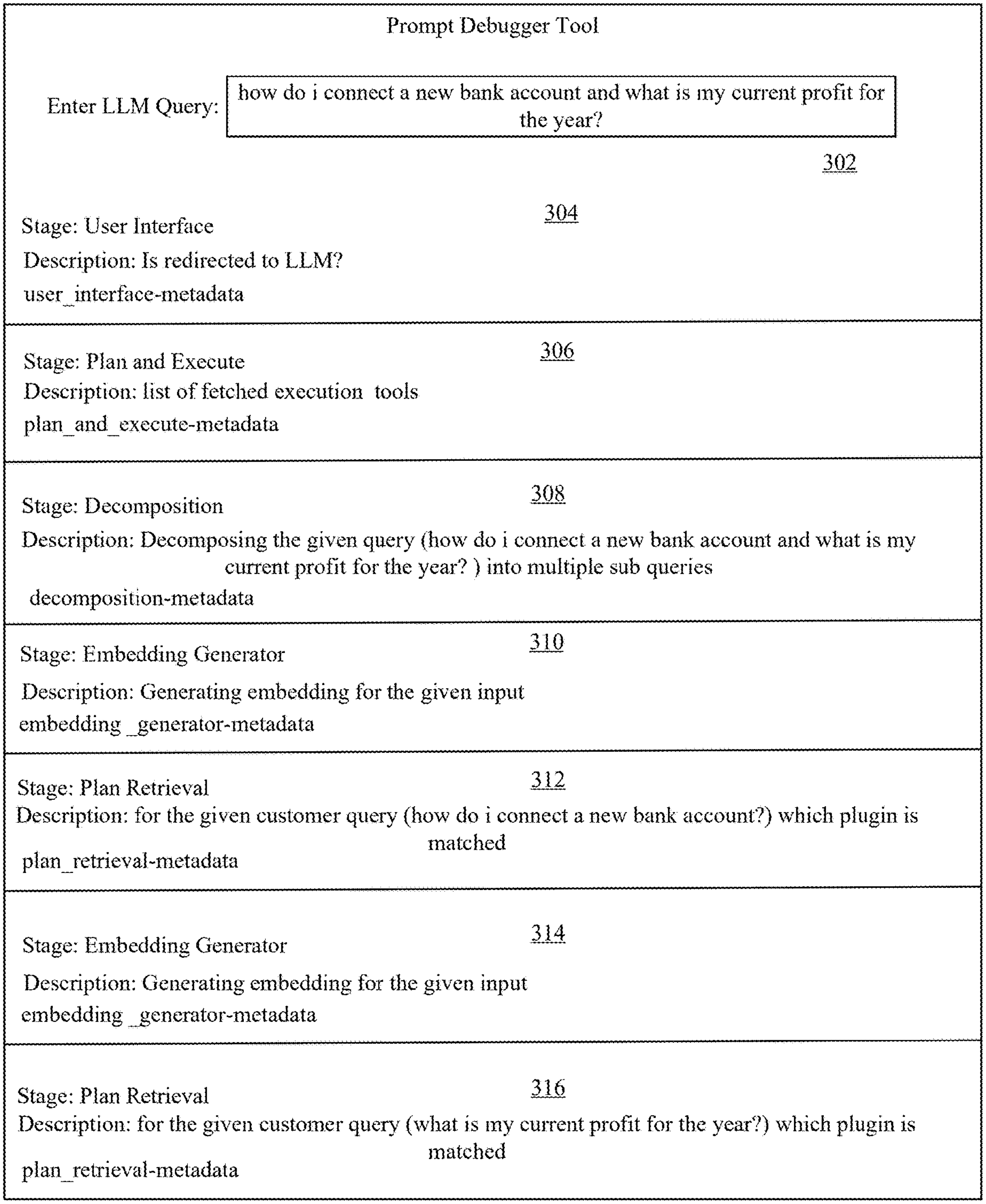
FIG. 3 shows an example customized rendering based on structured log data generated by the architecture shown in FIG. 2—and based on the principles disclosed herein.

FIG. 3 shows an example customized rendering 300 based on structured log data generated by the architecture 200, based on the principles disclosed herein. The example customized rendering 300 shows different stages 304, 306, 308, 310, 312, 314, 316 for an LLM query 302 ("how do I connect a new bank account and what is my current profit for the year"). The different stages show the name of the stage, description of the stage (e.g., written by the developer), and the metadata associated with the stage. As shown, a "User Interface" stage 304 includes a description "Is redirected to LLM" and associated metadata "user_interface-metadata."

The associated metadata can be presented in an expandable format for the developer to view additional details. A "Plan and Execute" stage 306 includes a description "list of fetched execution tools" and associated metadata "plan_and_execute-metadata"; a "Decomposition" stage 308 includes a description "Decomposing the given query (how do I connect a new bank account and what is my current profit for the year?) into multiple sub queries" and associated metadata "decomposition-metadata"; an "embedding_generator" stage 310 includes a description "Generating embedding for the given input" and associated metadata "embedding_generator-metadata"; a "Plan Retrieval" stage includes description "for the given customer query (How do I connect a new bank account) which plugin is matched" and associated metadata "plan_retrieval-metadata"; an "embedding_generator" stage 314 includes description "Generating embedding for the given input" and associated metadata "embedding_generator-metadata"; a "Plan Retrieval" stage 316 includes description "for the given customer query (What is my current profit for the year?) which plugin is matched" and associated metadata "plan_retrieval-metadata."

Turning back to FIG. 2, the long term storer 220 stores logs captured by the structured logger 214 in the long term storage 224. In one or more embodiments, the long term storage 224 may include a data lake, and transaction level logs are pushed to the data lake using Kafka®. The stored logs can be queried with transaction identifiers, visualized the by the execution graph generator 216 and developer interface generator 218 and then rendered in the developer user interface 222.

As another example operation within the architecture 200, a user types a query ""What is the total amount of invoices created in 2023? How to create a journal entry?" in one of the user applications 202. The structured logger 214 captures the execution flow as follows:

{
  "intuit_tid": 123,
  "timestamp": 53543533533,
  "debug_data": [
    {
      "stage_id": 1,
      "input": "Input to the process",
      "output": "Output to the process",
      "metadata": {all context specific metadata as key-value pairs}
      "Stage_description": " . . . description . . . ",
      "log_message": "free form log data passed by the service developer"
    },
    {
      "stage_id": 2
      "input": "Input to the process",
      "output": "Output to the process",
      "metadata": {all context specific metadata as key-value pairs}
      "Stage_description": " . . . description . . . ",
      "log_message": "free form log data passed by the service developer"
    }
    . . . .
  ]
}

From this structured data showing, the execution graph generator 216 generates summarized data as follows.

"user_input": "What is the total amount of invoices created in 2023? How to create a journal entry?",
"resolution_type": "PlanAndExecute",
"execution_path": {
"is_query_decomposed_in_orchestrator": true,
"selected_plugins": [
  "qna_plugin",
  "reporting_plugin"
],
"decomposited_query_to_plugin_results_map": {
  "sub_query_1": {
  "sub_query": "What is the total amount of invoices created in 2023?",
  "selected_plugin": "qbo_reporting_plugin",
  "status": 400,
  "output": "failed execution"
  },
  "sub_query_2": {
  "sub_query": "How to create a journal entry?",
  "selected_plugin": "qna_plugin",
  "status": 200,
  "output": "reference to tree-accordion node"
  }
}
},
"llm_usage": {
"used_model": "text-DaVinci-003",
"tokens_used": {
  "system_msg": 10,
  "user_msg": 20,
  "llm_response": 385
}
},
"latency": {
"time_in_internal_system": 3,
"time_spent_llm": 23
}
}

This above output also shows LLMs 212's usage and latencies. This output can also be used to render the execution graph.

Figure 4A:
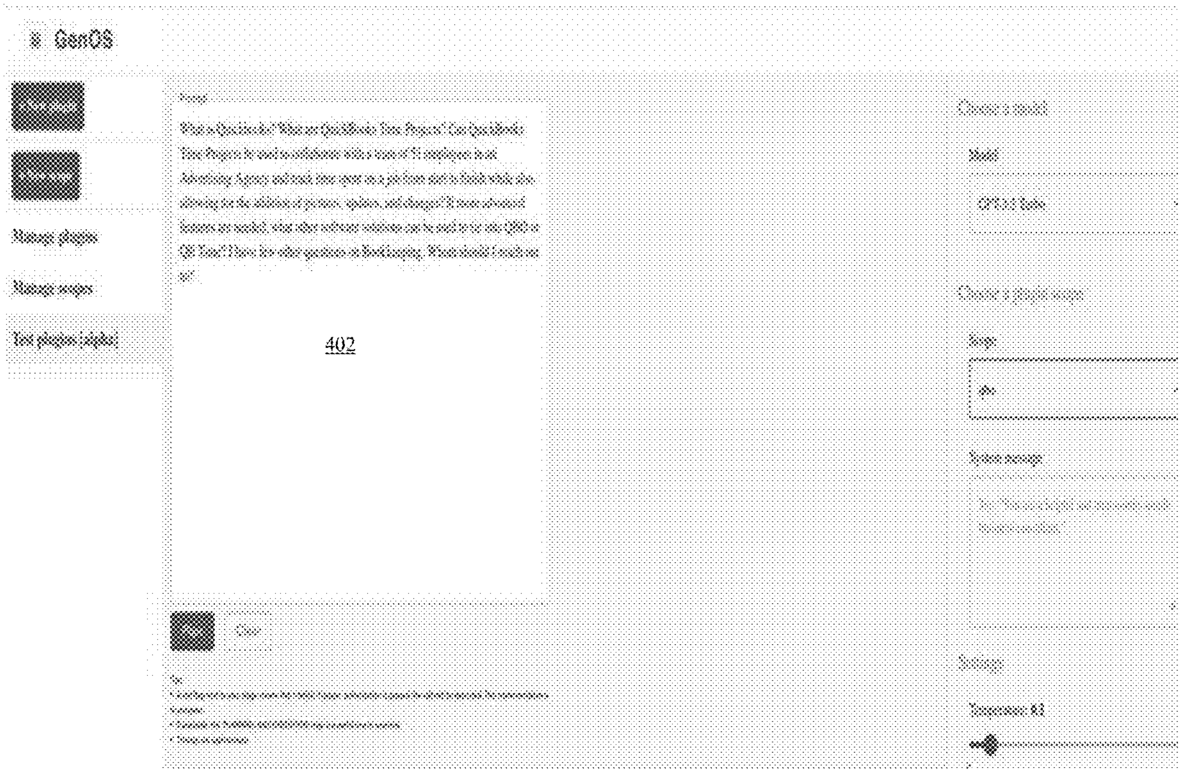
FIG. 4A shows an example developer user interface generated by the architecture shown in FIG. 2, based on the principles disclosed herein.

FIG. 4A shows an example developer user interface 400*a* generated by the architecture 200, based on the principles disclosed herein. The example developer user interface 400*a* shows a user query 402 that is typed by a user to receive an LLM based response. Here the user query 402 is typed by the developer user for debugging purposes.

Figure 4B:
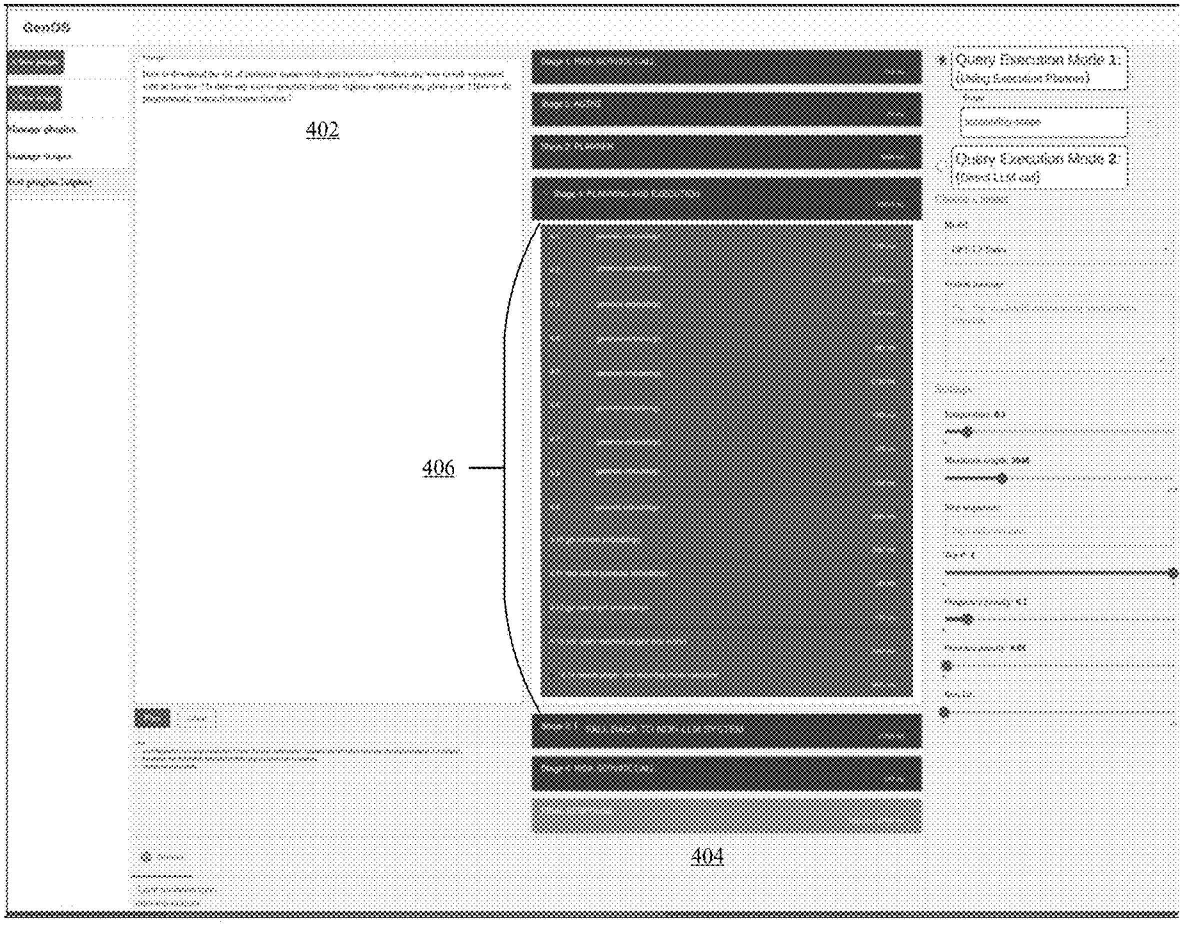
FIG. 4B shows an updated example developer user interface generated by the architecture shown in FIG. 2, based on the principles disclosed herein.

FIG. 4B shows an updated example developer user interface 400*b* generated by the architecture 200, based on the principles disclosed herein. The updated developer user interface 400*b* is generated by the developer interface generator 218 based on the execution graph (e.g., in JSON format) from the execution graph generator 216). The updated developer user interface 400*b* particularly shows different stages 404 of processing the user query 402. Non-limiting examples of the different stages 404 include "Stage 1: Risk Service Call," "Stage 2: Authorization," "Stage 3: Planner," "Stage 4: Planning and Execution," "Stage 5: Fall Back to Non-LLM System," "Stage 6: Risk Service Call," and "Final Response." The updated developer user interface 400*b* shows sub-stages 406 of "Stage 4: Planning and Execution" for processing the user query 402. Such sub-stages 406 are generated when the high level stage is more complex than other stages.

Figure 5:
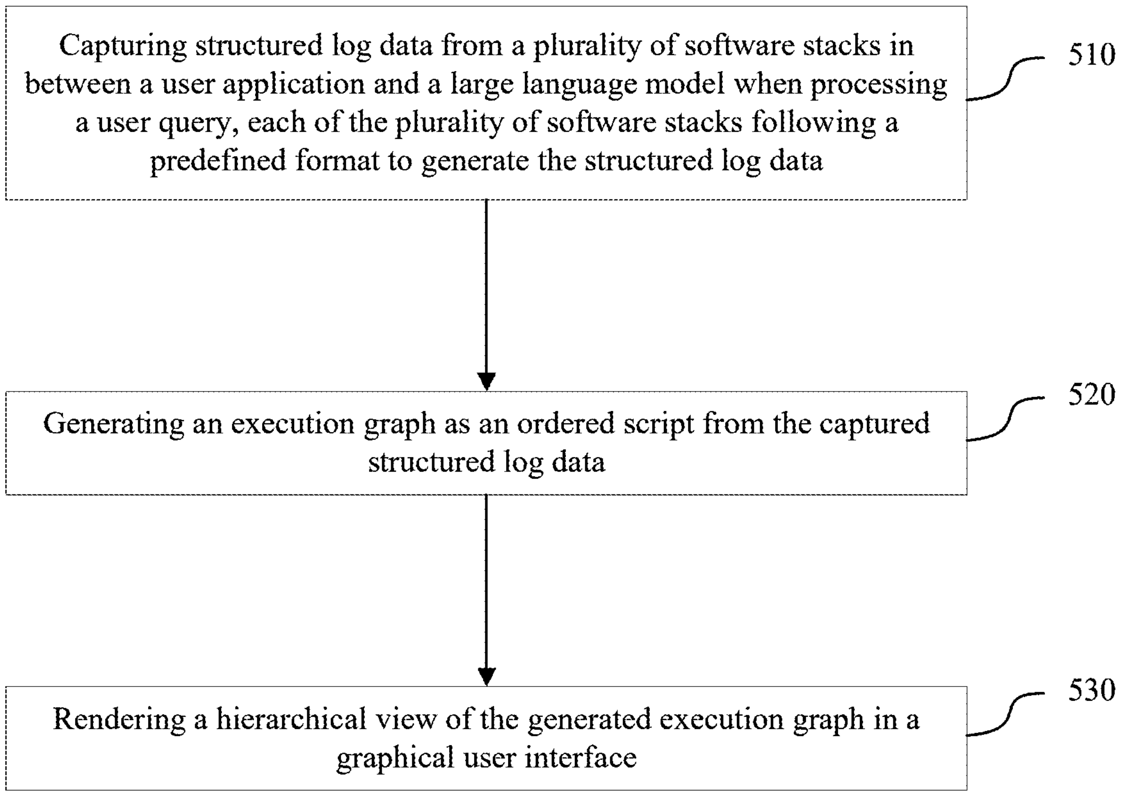
FIG. 5 shows a flowchart of an example method for logging and visualizing execution flow in an LLM enabled user application, based on the principles disclosed herein.

FIG. 5 is a flowchart of an example method 500 for logging and visualizing execution flow in an LLM enabled user application, based on the principles disclosed herein. It should be understood that the steps of the method are presented as examples and should not be considered limiting. That is, methods with additional, alternative, or fewer number of steps should also be considered within the scope of this disclosure. The steps of the method 500 can be performed by any portion of the system 100 or architecture 200.

The method begins at step 510, where structured log data from a plurality of software stacks in between a user application and an LLM is captured. The capturing is performed by the software stacks while the LLM are processing a user query. Each of the plurality of software stacks follow a predefined format to generate the structured log data. The structured data for each stage of processing the user query includes a stage name, description, input data, output data, and metadata.

At step 520, an execution graph as an ordered script from the captured structured log data is generated. In one or more embodiments, the ordered script may be in JSON format.

At step 530, a hierarchical view of the generated execution graph in a graphical user interface is rendered. A developer can toggle between high level views and low level view in the graphical user interface.

Figure 6:
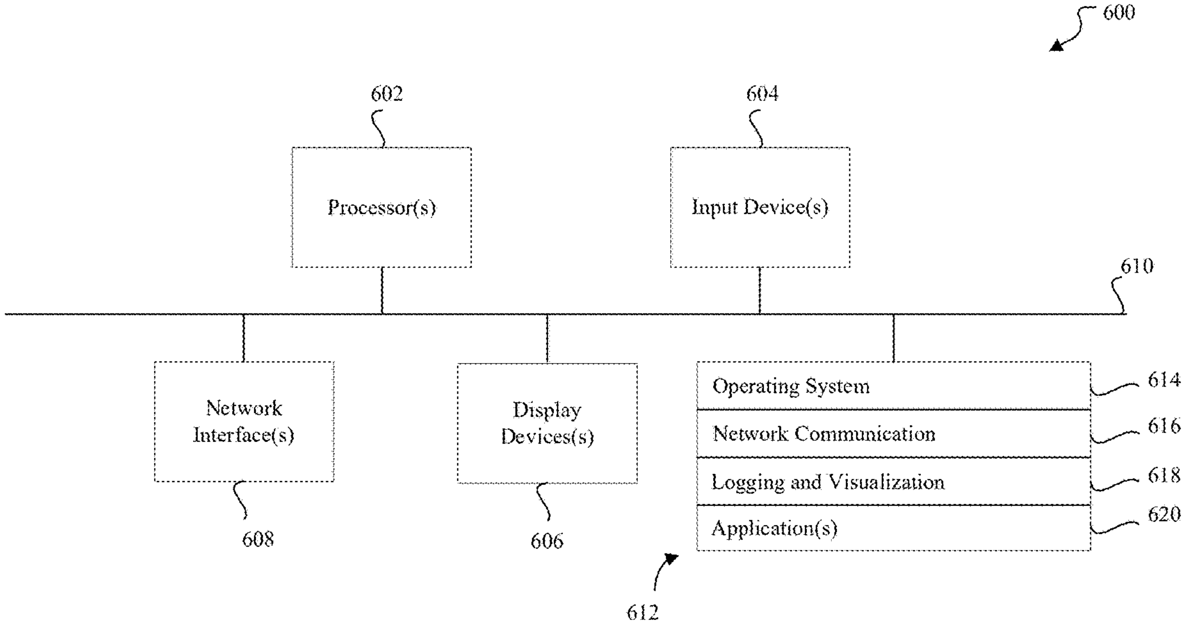
FIG. 6 shows a block diagram of an example computing device that implements various features and processes based on the principles disclosed herein.

FIG. 6 shows a block diagram of an example computing device 600 that implements various features and processes based on the principles disclosed herein. For example, computing device 600 may function as first server 120, second server 130, client 150*a*, client 150*b*, data lake 160 or a portion or combination thereof in some embodiments. The computing device 600 also forms one or more components of the architecture 200. The computing device 600 also performs one or more steps of the method 500. The computing device 600 is implemented on any electronic device that runs software applications derived from compiled instructions, including without limitation personal computers, servers, smart phones, media players, electronic tablets, game consoles, email devices, etc. In some implementations, the computing device 600 includes one or more processors 602, one or more input devices 604, one or more display devices 606, one or more network interfaces 608, and one or more computer-readable media 612. Each of these components is be coupled by a bus 610.

Display device 606 includes any display technology, including but not limited to display devices using Liquid Crystal Display (LCD) or Light Emitting Diode (LED) technology. Processor(s) 602 uses any processor technology, including but not limited to graphics processors and multi-core processors. Input device 604 includes any known input device technology, including but not limited to a keyboard (including a virtual keyboard), mouse, track ball, and touch-sensitive pad or display. Bus 610 includes any internal or external bus technology, including but not limited to ISA, EISA, PCI, PCI Express, USB, Serial ATA or FireWire. Computer-readable medium 612 includes any non-transitory computer readable medium that provides instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 612 includes various instructions 614 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 604; sending output to display device 606; keeping track of files and directories on computer-readable medium 612; controlling peripheral devices (e.g., disk drives, printers, etc.) which can be controlled directly or through an I/O controller; and managing traffic on bus 610. Network communications instructions 616 establish and maintain network connections (e.g., software for implementing communication protocols, such as TCP/IP, HTTP, Ethernet, telephony, etc.).

Logging and visualization 618 includes instructions that implement the disclosed embodiments for logging and visualizing execution flow during processing of user queries by large language models.

Application(s) 620 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term “at least one” may often be used in the specification, claims and drawings, the terms “a”, “an”, “the”, “said”, etc. also signify “at least one” or “the at least one” in the specification, claims and drawings.

Finally, it is the applicant’s intent that only claims that include the express language “means for” or “step for” be interpreted under 35 U.S.C. 112(f). Claims that do not expressly include the phrase “means for” or “step for” are not to be interpreted under 35 U.S.C. 112(f).

What is claimed is:

1. A computer-implemented method comprising:

receiving a predefined format for each software stack of a plurality of software stacks;

enforcing the predefined format across the plurality of software stacks situated in between a user application and a large language model;

capturing, by the plurality of software stacks while the large language model is processing a user query, structured log data from the plurality of software stacks to uniformly log an execution flow in the plurality of software stacks, wherein each software stack of the plurality of software stacks follows the predefined format to generate the structured log data, and wherein the structured log data comprises, for each stage of processing the user query, an input into the stage of processing the user query, an output from the stage of processing the user query, a description of the stage of processing the user query, and metadata associated with the stage of processing the user query;

generating an execution graph as an ordered script from the captured structured log data; and rendering a hierarchical view of the generated execution graph in a graphical user interface to facilitate a visualization of the execution flow in the plurality of software stacks, wherein the graphical user interface is configured to allow toggling between high level views and low level views in the hierarchical view of the generated execution graph.

2. The computer-implemented method of claim 1, the capturing of the structured log data comprising:

capturing the structured log data from the plurality of software stacks within an orchestration layer situated in between the user application and the large language model.

3. The computer-implemented method of claim 1, the generating of the execution graph comprising:

generating the execution graph using a portion of the captured structured log data having a predetermined persistency flag set.

4. The computer-implemented method of claim 1, further comprising:

pushing at least a portion of the captured structured log data to a long term storage.

5. The computer-implemented method of claim 1, further comprising:

pushing at least a portion of the captured structured log data organized by a transaction identification to a long term storage.

6. The computer-implemented method of claim 1, further comprising:

generating a summary of the captured structured log data, wherein the summary of the captured structured log data comprises the generated execution graph.

7. The computer-implemented method of claim 1, further comprising:

generating a summary of the captured structured log data, wherein the summary of the captured structured log data identifies the large language model and a latency of processing the user query.

8. The computer-implemented method of claim 1, the rendering of the hierarchical view of the generated execution graph comprising:

rendering the hierarchical view of the generated execution graph in the graphical user interface configured to allow toggling between stages of processing the user query and corresponding sub-stages of processing the user query.

9. A system comprising:

a non-transitory computer-readable storage medium storing computer program instructions; and a processor configured to execute the computer program instructions to cause operations comprising:

receiving a predefined format for each software stack of a plurality of software stacks;

enforcing the predefined format across the plurality of software stacks situated in between a user application and a large language model;

capturing, by the plurality of software stacks while the large language model is processing a user query, structured log data from the plurality of software stacks to uniformly log an execution flow in the plurality of software stacks, wherein each software stack of the plurality of software stacks follows the predefined format to generate the structured log data, and wherein the structured log data comprises, for each stage of processing the user query, an input into the stage of processing the user query, an output from the stage of processing the user query, a description of the stage of processing the user query, and metadata associated with the stage of processing the user query;

generating an execution graph as an ordered script from the captured structured log data; and rendering a hierarchical view of the generated execution graph in a graphical user interface to facilitate a visualization of the execution flow in the plurality of software stacks, wherein the graphical user interface is configured to allow toggling between high level views and low level views in the hierarchical view of the generated execution graph.

10. The system of claim 9, the capturing of the structured log data comprising:

capturing the structured log data from the plurality of software stacks within an orchestration layer situated in between the user application and the large language model.

11. The system of claim 9, the generating of the execution graph comprising:

generating the execution graph using a portion of the captured structured log data having a predetermined persistency flag set.

12. The system of claim 9, the operations further comprising:

pushing at least a portion of the captured structured log data to a long term storage.

13. The system of claim 9, the operations further comprising:

pushing at least a portion of the captured structured log data organized by a transaction identification to a long term storage.

14. The system of claim 9, the operations further comprising:

generating a summary of the captured structured log data, wherein the summary of the captured structured log data comprises the generated execution graph.

15. The system of claim 9, the operations further comprising:

generating a summary of the captured structured log data, wherein the summary of the captured structured log data identifies the large language model and a latency of processing the user query.

16. The system of claim 9, the rendering of the hierarchical view of the generated execution graph comprising:

rendering the hierarchical view of the generated execution graph in the graphical user interface configured to allow toggling between stages of processing the user query and corresponding sub-stages of processing the user query.

* * * * *